United States Patent

Carney et al.

[11] Patent Number: 5,913,218
[45] Date of Patent: Jun. 15, 1999

[54] SYSTEM AND METHOD FOR RETRIEVING AND UPDATING CONFIGURATION PARAMETER VALUES FOR APPLICATION PROGRAMS IN A COMPUTER NETWORK

[75] Inventors: Michael W. Carney, Merrimac; Mary U. Lautman, Reading; William F. Pittore, Lexington, all of Mass.

[73] Assignee: Sun Microsystems, Inc, Palo Alto, Calif.

[21] Appl. No.: 08/554,557

[22] Filed: Nov. 6, 1995

[51] Int. Cl.⁶ .................................................. G06F 17/30
[52] U.S. Cl. ............................................... 707/200; 707/1
[58] Field of Search ..................... 395/616, 609, 395/610, 600, 500, 800, 601, 700, 651, 828; 370/260; 707/200, 1

[56] References Cited

U.S. PATENT DOCUMENTS

| | | | |
|---|---|---|---|
| 5,257,387 | 10/1993 | Richek et al. | 395/800 |
| 5,263,148 | 11/1993 | Jones, Jr. et al. | 395/500 |
| 5,263,157 | 11/1993 | Janis | 395/600 |
| 5,335,436 | 8/1994 | Fabbio | 395/600 |
| 5,339,432 | 8/1994 | Crick | 395/700 |
| 5,339,435 | 8/1994 | Crick et al. | 395/700 |
| 5,353,432 | 10/1994 | Richek et al. | 395/500 |
| 5,432,941 | 7/1995 | Crick et al. | 395/700 |
| 5,450,570 | 9/1995 | Richek et al. | 395/500 |
| 5,499,357 | 3/1996 | Sonty et al. | 395/600 |
| 5,574,898 | 11/1996 | Leblang et al. | 395/601 |
| 5,590,128 | 12/1996 | Maloney et al. | 370/260 |
| 5,594,910 | 1/1997 | Filepp et al. | 395/800 |
| 5,613,123 | 3/1997 | Tsang et al. | 395/651 |
| 5,655,148 | 8/1997 | Richman et al. | 395/828 |
| 5,713,009 | 1/1998 | DeRosa, Jr. et al. | 395/500 |

OTHER PUBLICATIONS

Ousterhout et al, The Sprite Network Operating System, IEEE, pp. 23–36, Feb. 1988.
Thomas, A Mandatory Access Control Mechanism for the Unix File System, IEEE, pp. 173–177, Dec. 1988.

Primary Examiner—Thomas G. Black
Assistant Examiner—Frantz Coby
Attorney, Agent, or Firm—Richard A. Jordan

[57] ABSTRACT

A configuration parameter value access system used in connection with a computer system performs an access operation in connection with a configuration parameter in response to a configuration parameter access request from an applications program. Each configuration parameter access request includes a parameter class identifier, a filename and a parameter identifier. The configuration parameter value access system includes a plurality of configuration file path class lists, each of which has at least one entry, each entry defining a storage subsystem path in the computer system's storage subsystem. A file identifier generator tests successive entries of the configuration file path class list identified by the parameter class identifier to determine whether the storage subsystem contains a file which has the filename provided in the configuration parameter access request along a path defined by an entry. If so, a configuration parameter access module performs an access operation to retrieve or update the configuration parameter identified by the parameter identifier provided in the configuration parameter access request in the file identified by the file identifier generator. If the access operation is a retrieval operation, to retrieve the value of the configuration parameter, the configuration parameter value access system will retrieve the value of the parameter, if any, in the file identified by the file identifier generator. If the access operation is an update operation, to update the value of the configuration parameter, the configuration parameter value access system will update the value of the parameter in the file identified by the file identifier generator, or create the file if no file currently exists.

45 Claims, 12 Drawing Sheets

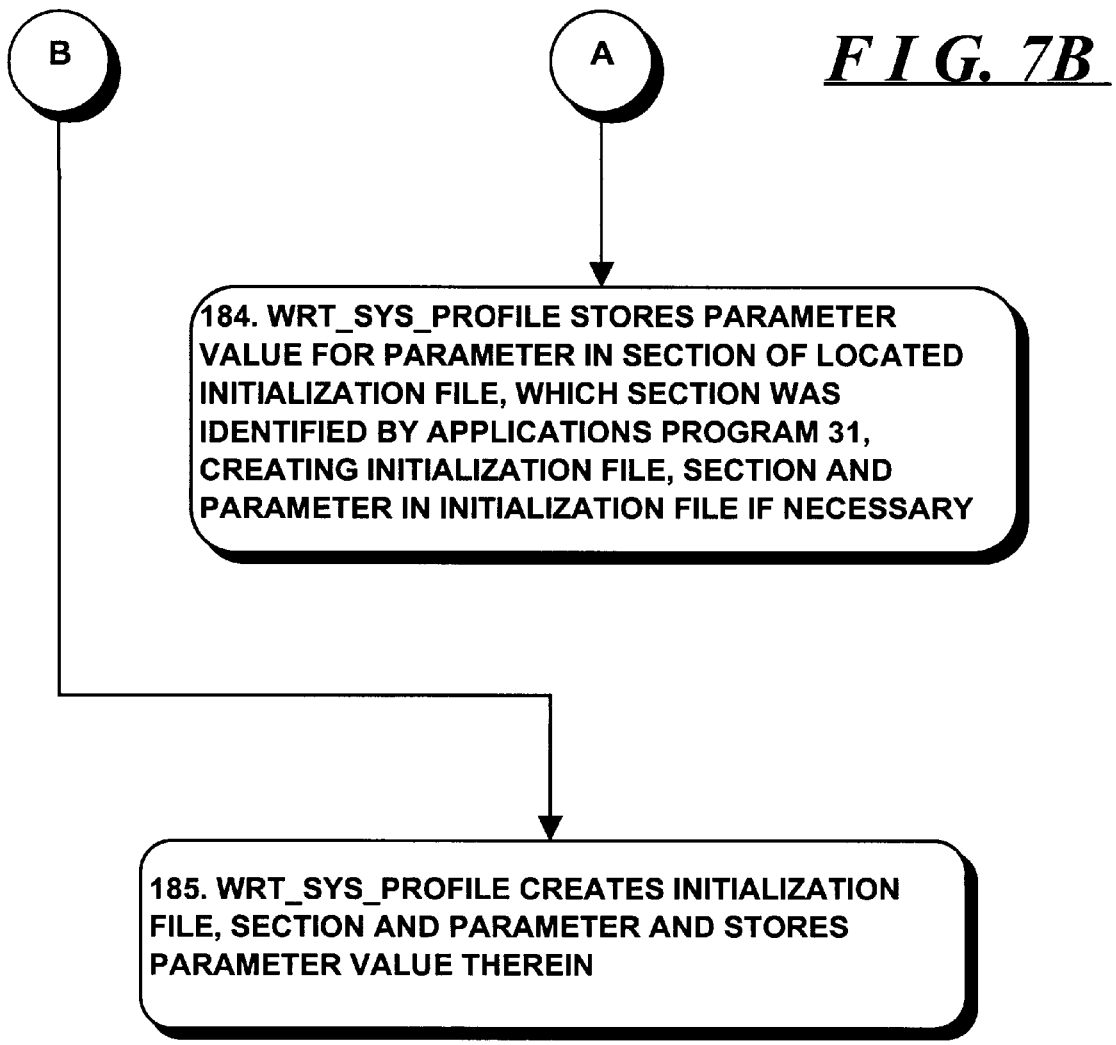

SYSTEM AND METHOD FOR RETRIEVING AND UPDATING CONFIGURATION PARAMETER VALUES FOR APPLICATION PROGRAMS IN A COMPUTER NETWORK

FIELD OF THE INVENTION

The invention relates generally to the field of networked digital computer systems, in which a number of individual computer systems are interconnected by a network over which they can share information. The invention more particularly provides a system and method for retrieving and updating configuration parameter values for application programs from specific files, whose locations may be controlled by, for example, a system administrator.

BACKGROUND OF THE INVENTION

In modern "enterprise" digital data processing systems, that is, computer systems for use in an office environment in a company, a number of personal computers, workstations, and other devices such as mass storage subsystems, network printers and interfaces to the public telephony system, are typically interconnected in a computer network. The personal computers and workstations are used by individual users to perform processing in connection with data and programs that may be stored in the network mass storage subsystems. In such an arrangement, the personal computers/workstations, operating as clients, download the data and programs from the network mass storage subsystems for process. In addition, the personal computers or workstations will enable processed data to be uploaded to the network mass storage subsystems for storage, to a network printer for printing, to the telephony interface for transmission over the public telephony system, or the like. In such an arrangement, the network mass storage subsystems, network printers and telephony interface operate as servers, since they are available to service requests from all of the clients in the network. By organizing the network in such a manner, the servers are readily available for use by all of the personal computers/workstations in the network. Such a network may be spread over a fairly wide area, with the personal computers/workstations are interconnected by communication links such as electrical wires or optic fibers.

Users of personal computers and workstations can often modify and adjust certain operational characteristics, or "configurations," according to their individual needs and tastes, including, for example, the default positions, colors and organizations of windows of particular applications programs, an applications program's default working directory (that is, the directory in which data will be stored), the particular indicia which will be displayed to the user, such as the names of fonts, and text items to be used in menus, lists or dialog boxes, as well as such settings for communications devices or communications sessions. When the personal computers and workstations are connected in a network, it is often desirable to have certain of these operational characteristics be controlled on a user-by-user basis or on a computer-by-computer basis, whereas other characteristics should be uniform over the entire network. For example, a user may wish to control such characteristics as the default positions, colors and organizations of windows of particular applications programs based on his or her personal tastes. Similarly, a system administrator may wish to control such characteristics as the settings for communications devices or communications sessions on a computer-by-computer basis based on the computer's particular hardware configuration. On the other hand, a system administrator may wish to control such characteristics as names of fonts, and text items to be used in menus, lists or dialog boxes on a network basis, so that these items will be uniform across the network.

Configuration information is typically stored in a number of files, which the operating system programs and application programs may use during initialization and thereafter to control their operational characteristics. For example, in one popular operating system program, namely, the Microsoft Windows operating system program, particularly Version 3.1, configuration information is typically stored in certain initialization files.

SUMMARY OF THE INVENTION

The invention provides a new and improved system and method for controlling the retrieval and updating of configuration parameters which control operational characteristics of computer systems and the programs processed thereby in a computer network, based on selected characteristic classifications for the various operational characteristics. For example, certain characteristics may be classified as controllable on a user-by-user basis, whereas others may be classified controllable on a computer-by-computer basis or a network-wide basis. The system and method control the retrieval and updating of the configuration information by controlling, on a class-by-class basis, the locations of files which contain configuration information defining the respective characteristics, from which a computer system will retrieve the configuration information or in which the computer system will store updated configuration information.

In brief summary, the invention provides a configuration parameter value access system used in connection with a computer system performs an access operation in connection with a configuration parameter in response to a configuration parameter access request from an applications program. Each configuration parameter access request includes a parameter class identifier, a filename and a parameter identifier. The configuration parameter value access system includes a plurality of configuration file path class lists, each of which has at least one entry, each entry defining a storage subsystem path in the computer system's storage subsystem. A file identifier generator tests successive entries of the configuration file path class list identified by the parameter class identifier to determine whether the storage subsystem contains a file which has the filename provided in the configuration parameter access request along a path defined by an entry. If so, a configuration parameter access module performs an access operation to retrieve or update the configuration parameter identified by the parameter identifier provided in the configuration parameter access request in the file identified by the file identifier generator. If the access operation is a retrieval operation, to retrieve the value of the configuration parameter, the configuration parameter value access system will retrieve the value of the parameter, if any, in the file identified by the file identifier generator. If the access operation is an update operation, to update the value of the configuration parameter, the configuration parameter value access system will update the value of the parameter in the file identified by the file identifier generator, or create the file if no file currently exists. The paths listed in the various configuration parameter class lists can be controlled by a system administrator on a class-by-class basis, which enables the system administrator to control the locations of the configuration parameter files from which the configuration parameters will be obtained.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
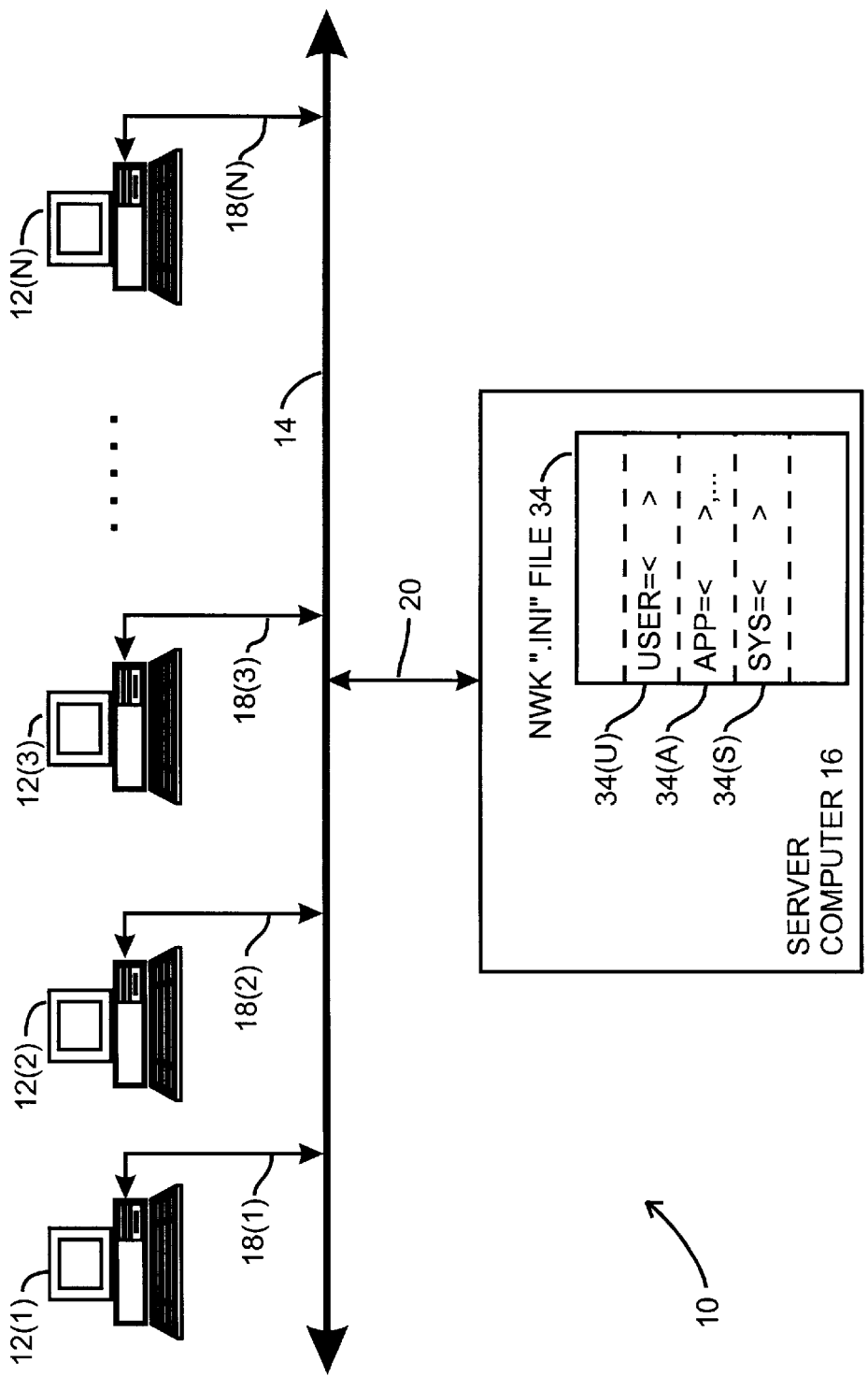
FIG. 1 is a schematic diagram of a computer network including a configuration parameter value retrieval and update system constructed in accordance with the invention.

FIG. 1 is a schematic diagram of a computer network including a configuration parameter value retrieval and update system for enabling application programs to obtain initialization and configuration information from specific files in a computer network, constructed in accordance with the invention. With reference to FIG. 1, computer network 10 includes a plurality of computers 12(1) through 12(N) (generally identified by reference numeral 12(n)) and 16 which are interconnected by a communication link 14. As is conventional, at least some of the computers 12(n) are in the form of personal computers or computer workstations, each of which includes a system unit, a video display unit and operator input devices such as a keyboard and mouse. The computer 16 also includes a system unit, and may also include a video display unit and operator input devices. The computers 12(n) and 16 are of the conventional stored-program computer architecture. A system unit generally includes processing, memory, mass storage devices such as disk and/or tape storage elements and other elements (not separately shown), including network interface devices 18(n), 20 for interfacing the computer to the communication link 14. A video display unit permits the computer to display processed data and processing status to the user, and an operator input device enable the user to input data and control processing by the computer. The computers 12(n) and 16 transfer information, in the form of messages, through their respective network interface devices 18(n), 20 among each other over the communication link 14.

In one embodiment, the network 10 is organized in a "client-server" configuration, in which at least one computer, namely, computer 16, operates as a server, and the other computers 12(n) operate as clients. Typically, the servers include large-capacity mass storage devices which can store copies of programs and data which are available for retrieval by the client computers over the communication link 14 for use in their processing operations. From time to time, a client computer 12(n) may also store data on the server computer 16, which may be later retrieved by it (the client computer that stored the data) or other client computers for use in their processing operations. The server computer may be generally similar to the client computers 12(n), including a system unit, video display unit and operator input devices and may be usable by an operator for data processing operations in a manner similar to a client computer. Alternatively, at least some of the server computers may include only processing, memory, mass storage and network interface elements for receiving and processing retrieval or storage requests from the client computers, and generating responses thereto.

The communication link 14 interconnecting the client computers 12(n) and server computer 16 in the network 10 may, as is conventional, comprise wires, optical fibers or other media for carrying signals representing information among the computers 12(n) and 16. As noted above, each of the computers 12(n) typically includes a network interface device (represented by respective arrows 18(n) and 20), which connects the respective computer to the communications link 14.

In one particular embodiment, the computers 12(n) use the Microsoft Windows™ operating system program ("Windows"), and the server computer 16 uses the Microsoft Windows-NT operating system program. Windows provides a number of conventional operating system services in connection with the computers 12(n), including initializing the computers when they are powered-up or reinitialized. In addition, Windows provides a number of conventional operating system services to applications programs that are processed by the computers, including providing a graphical user interface ("GUI"). During initialization and in providing operating system program services to applications programs, Windows normally uses the contents of certain initialization files to provide values for initial configuration parameters to be used by Windows when initializing the respective computer 12(n) and when initializing various applications programs. In Windows, the initialization files are the files identified by a file extension ".INI." As is conventional, a Windows file with the complete file name of the form "XXX.INI" file has "XXX" as a file name, and "INI" as the file extension. The ".INI" file extension identifies the file as an initialization file.

The parameter values from the ".INI" files may be used to identify a number of configuration and other characteristics such as, for example, the default position and organization of an applications program's windows at initialization as well as the colors to be used for various components of the windows. In addition, parameter values may be used to identify associations between certain names and other indicia (such as names of text fonts) which are displayed to the user, as well as the names and locations of computer files which contain the font information used by the computer in generating font images. Parameter values contained in a ".INI" file may also contain the actual text which the associated applications program will display as items in certain menus, or list or dialog boxes, as well as information used by the applications program when the user selects an item. In connection with a communications program, for example, which initiates communications over a network, parameter values in a ".INI" initialization file may identify certain communications parameters, such as default message or data rate, the interrupt number to be by a network interface used when it interrupts the computers processor, any error detection or correction methodologies to be used, data strings which are to be used to initialize the communications hardware such as a network interface or a modem, as well as default communications parameters such as the number of data, parity and stop bits to be used during a communications session with a particular device.

It will be appreciated that certain aspects of the configuration of a computer 12(n) which are controlled by the parameter values, such as the default positions, colors and organizations of windows of particular applications programs, may be particularly pleasing to a user, and it may be desirable to allow a user to have be able to control those aspects and have them available to him or her regardless of the particular computer 12(n) on which he or she runs the applications program.

On the other hand, a system administrator may wish to have other configuration aspects the same across the entire network 10. For example, the system administrator may wish configuration aspects such as an applications program's default working directory in which data will be stored, the particular indicia which will be displayed to the user, such as the names of fonts, and text items to be used in menu, list or dialog box text, to be the same regardless of the computer 12(*n*) in network 10 on which the program may be processed. In that case, the system administrator will ensure that configuration parameters identifying the applications program's default working directory, associations between particular font names and the names and locations of computer files which contain font image design information, and operations to be performed in response to a user's selection of particular menu, list or dialog box text will need to be the same across the entire network 10.

Finally, the system administrator may need to control other configuration aspects, such as those relating to specific hardware items included in a computer 12(*n*), such as communications devices or communications session parameters, interrupt number and the like, on a computer-by-computer basis as determined by, for example, the computer's particular hardware configuration.

Figure 2:
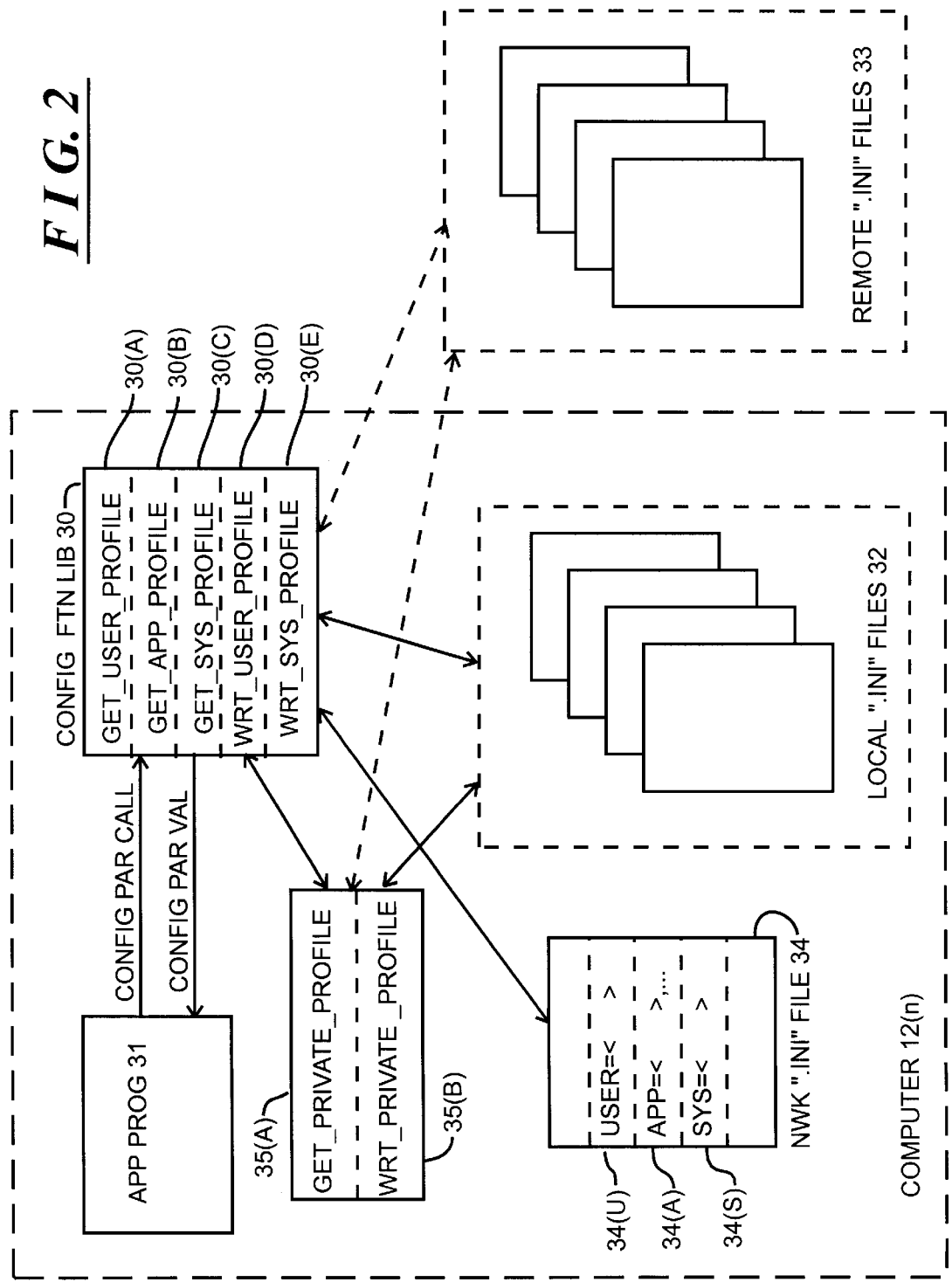
FIG. 2 is a functional block diagram depicting data structures which are useful in understanding the configuration parameter value retrieval and update system depicted in FIG. 1.

The invention provides a configuration parameter value retrieval and update system which may selectively retrieve values of the configuration parameters from or update configuration parameter values in, may be selectively retrieved and used, or updated in various ".INI" initialization files, on a user, application and system basis (that is, a "parameter class" basis), as determined by an applications program when it is initialized. The configuration parameter value retrieval and update system will be described in detail in connection with FIG. 2, which depicts various data structures which will be useful in understanding the system and FIGS. 3A through 7B which comprise flowcharts describing operations performed in connection with the system. With reference initially to FIG. 2, each computer 12(*n*) is provided with a configuration function library 30 which includes a number of configuration functions 30(A) through 30(E) (generally identified by reference numeral 30(*c*)) which an applications program 31 can call to, in turn, obtain configuration parameter values (in the case of configuration functions 30(A) through 30(C)) and update configuration parameter values (in the case of configuration functions 30(D) and 30(E)). The configuration information may be located in local ".INI" initialization files 32 which are local to the computer 12(*n*), or in remote ".INI" files 33 which may be located on other computers 12(*n*) connected in the network 10 or on the server 16 and accessed over the communication link 14.

The configuration library functions 30(*c*) use certain path and filename information as provided by the applications program 31 in a configuration parameter call "CONFIG PAR CALL," along with initialization file location information from a network initialization file 34, to determine the actual location of the ".INI" initialization file from which configuration parameter value information is to be obtained for the applications program 31 or in which updated configuration parameter value information is to be stored. As shown on FIG. 1, the network initialization file 34 is initially located on the server 16, and is retrieved by the computer 12(*n*) when Windows is initialized on the computer 12(*n*), so that a copy of the file 34 is maintained on the computer 12(*n*) while Windows is operating.

The network ".INI" initialization file 34 includes initialization file location information including mass storage device and path information which, when concatenated with path and filename information provided by the applications program 31 in a configuration parameter call, provides a full device, path and filename to identify the location of the ".INI" initialization file to provide the configuration parameter value information be used by the applications program 31. The mass storage device information identifies the particular mass storage device on which the file is located, which may be a "local" device on the computer 12(*n*) itself, or a "remote" device which is accessed over the communication link 14 in a conventional manner. The configuration functions 30(A) through 30(E) in the library 30, in response to a configuration parameter call from an applications program 31, use the information provided by the network ".INI" initialization file 34 and along with path and filename information in the configuration parameter call to identify the location and initialization file from which it retrieves the configuration parameter value information "CONFIG PAR VAL," which they provide to the applications program 31. The system administrator can control the initialization file location information, including the mass storage device and path information, in the network ".INI" initialization file 34, and thereby control the locations in the network for the ".INI" initialization files from which configuration parameter values will be obtained or in which they will be updated.

More specifically, the configuration function library includes a number of configuration functions 30(A) through 30(E) which may be called, including a GET_USER_PROFILE function 30(A), a GET_APP_PROFILE function 30(B), a GET_SYS_PROFILE function 30(C), a WRT_USER_PROFILE function 30(D) and a WRT_SYS_PROFILE function 30(E), all of which may be called by an applications program 31. The applications program 31 may call the GET_USER_PROFILE function 30(A), GET_APP_PROFILE function 30(B), and the GET_SYS_PROFILE function 30(C), to initiate the retrieval of user, applications program, and system configuration parameter value information, respectively, as described above, from the local or remote ".INI" initialization files 32 or 33. In addition, the applications program 31 may call the WRT_USER_PROFILE function 30(D) and the WRT_SYS_PROFILE function 30(E) to enable the update of user and system configuration parameter value information, respectively as described above from the respective local or remote ".INI" initialization files 32 or 33. In one particular embodiment, the GET_USER_PROFILE function 30(A), GET_APP_PROFILE function 30(B), and GET_SYS_PROFILE function 30(C) determine the location of a local or remote ". INI" initialization file 32 or 33 from which the parameter value is to be obtained and make use of Windows' "GET_PRIVATE_PROFILE" get private profile function 35(A) to actually retrieve the required parameter value. In that embodiment, the WRT_USER_PROFILE function 30(D) and the WRT_SYS_PROFILE function 30(E) determines the location of a local or remote ".INI" initialization file 32 or 33 into which the parameter value is to be stored and make use of Windows' "WRT_PRIVATE_PROFILE" write private profile function 35(B) to actually store the required parameter value.

The network "INI" initialization file 34 includes three fields, namely, a user initialization file location information field 34(U) for storing user initialization file location information, an applications program initialization file location information field 34(A) for storing applications program initiaztion file location information and a system initialization file location information field 34(S) for storing system initialization file location information. The user initialization file location information in field 34(U) comprises storage device and path location information which the GET_USER_PROFILE and WRT_USER_PROFILE functions 30(A) and 30(D) use. Similarly, the applications program initialization file location information in field 34(A) comprises storage device and path location information which the GET_APP_PROFILE functions 30(B) uses, and the system initialization file location information in field 34(S) comprises storage device and path location information which the GET_SYS_PROFILE and WRT_SYS_PROFILE functions 30(C) and 30(E) use.

In each field 34(U), 34(A) and 34(S) in the network ".INI" initialization file, the information contained in the field comprises one or more entries each in the form of "d:<absolute_path>", where "d" is a drive identifier and "<absolute_path>" refers to a path through at least a portion of a directory system on the drive identified by the drive identifier "d" from the drive's root. The drive identifier "d" of each entry may identify a drive on the computer 12(n) itself or a drive on another computer or on the server 16. If the drive identifier "d" identifies a drive on the computer itself, an ".INI" initialization file accessed using the drive identifier will constitute a local ".INI" initialization file 32. On the other hand, if the drive identifier "d" identifies a drive on another computer or on the server 16, an ".INI" initialization file accessed using the drive identifier will constitute a remote ".INI" initialization file 33.

In one embodiment, each of the GET_USER_PROFILE function 30(A), GET_APP_PROFILE function 30(B) and the GET_SYS_PROFILE function 30(c) uses a number of call parameters provided by the applications program 31, including a section and configuration parameter identifier "SEC ID" and "CONFIG PAR ID", default configuration parameter value information, and path/filename information of the form "<relative_path><filename>." The default value information may be in the form of the actual default value or a pointer to a storage location which contains the default value.

Figure 3A:
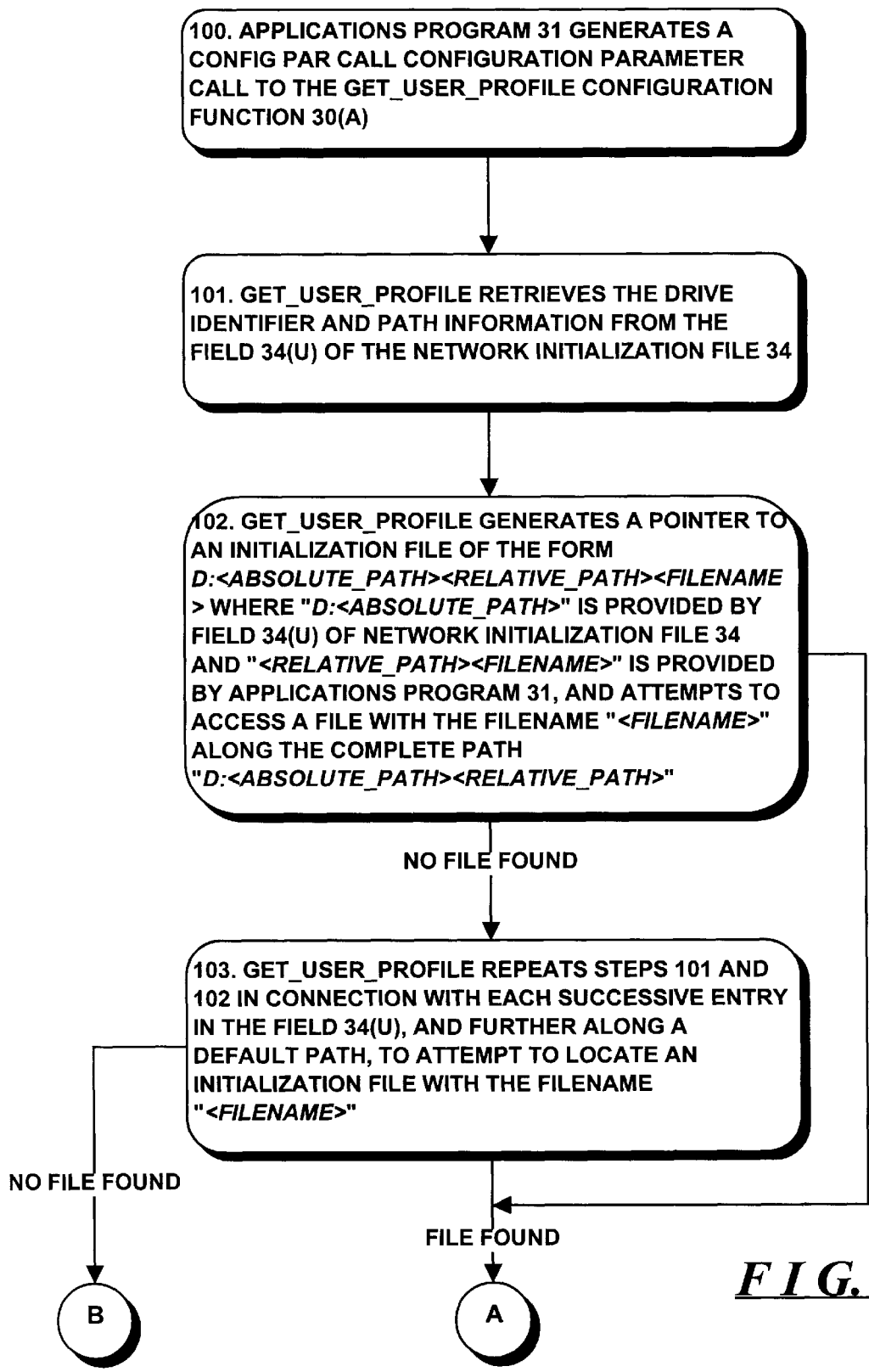
FIGS. 3A through 7B are a flowcharts depicting operations performed by the configuration parameter value retrieval and update system described in connection with FIGS. 1 and 2.
Figure 3B:
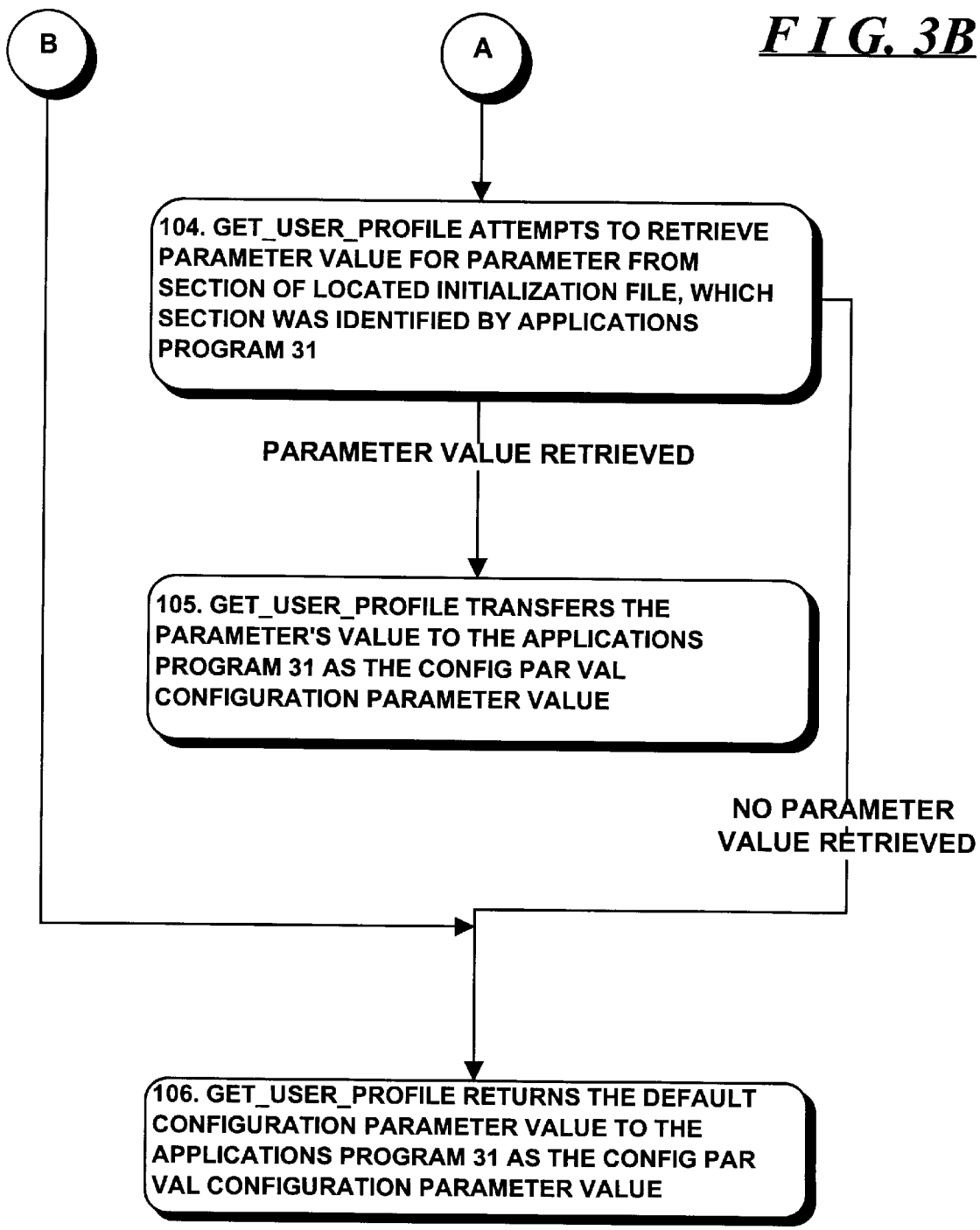
Figure 4A:
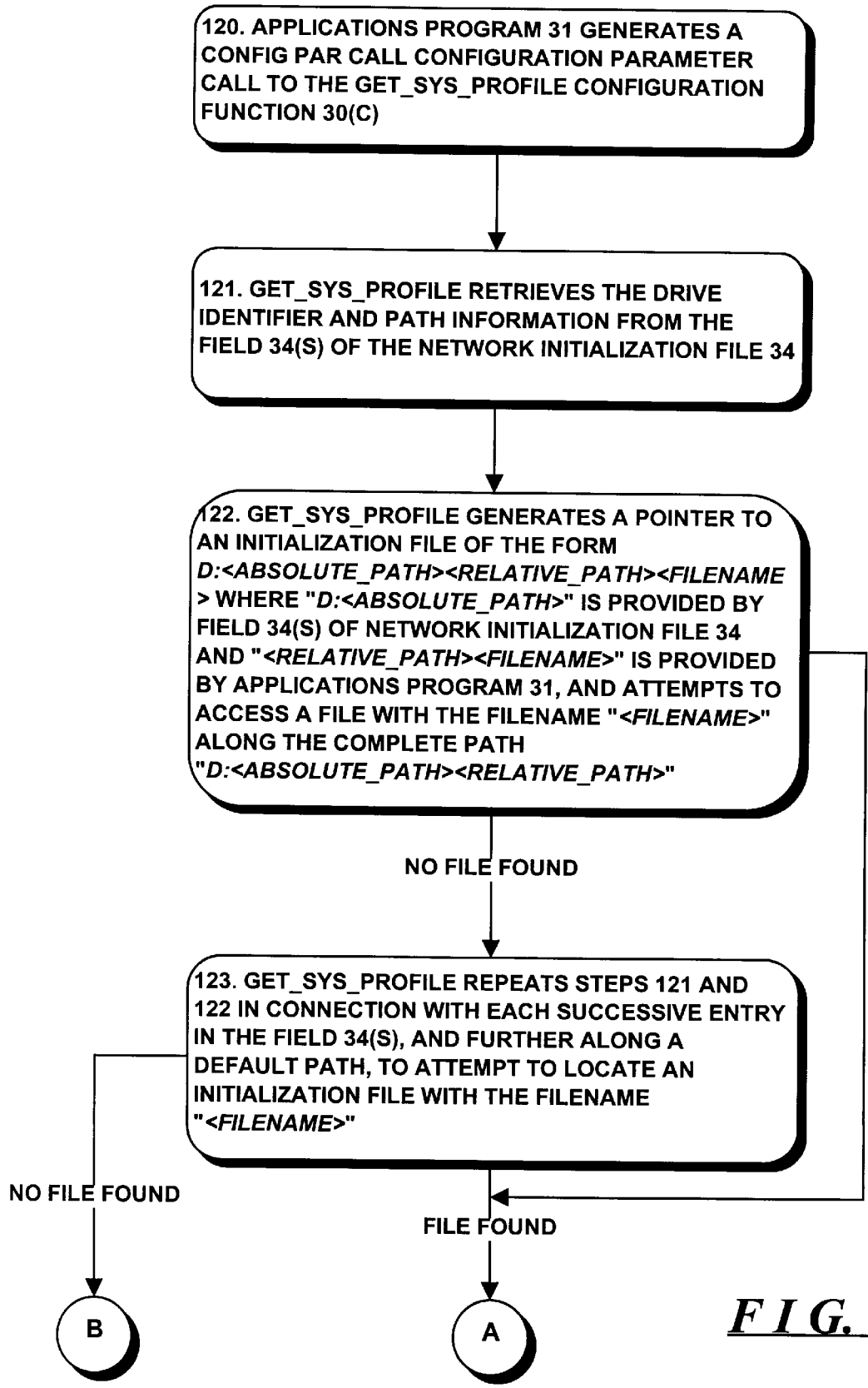
Figure 4B:
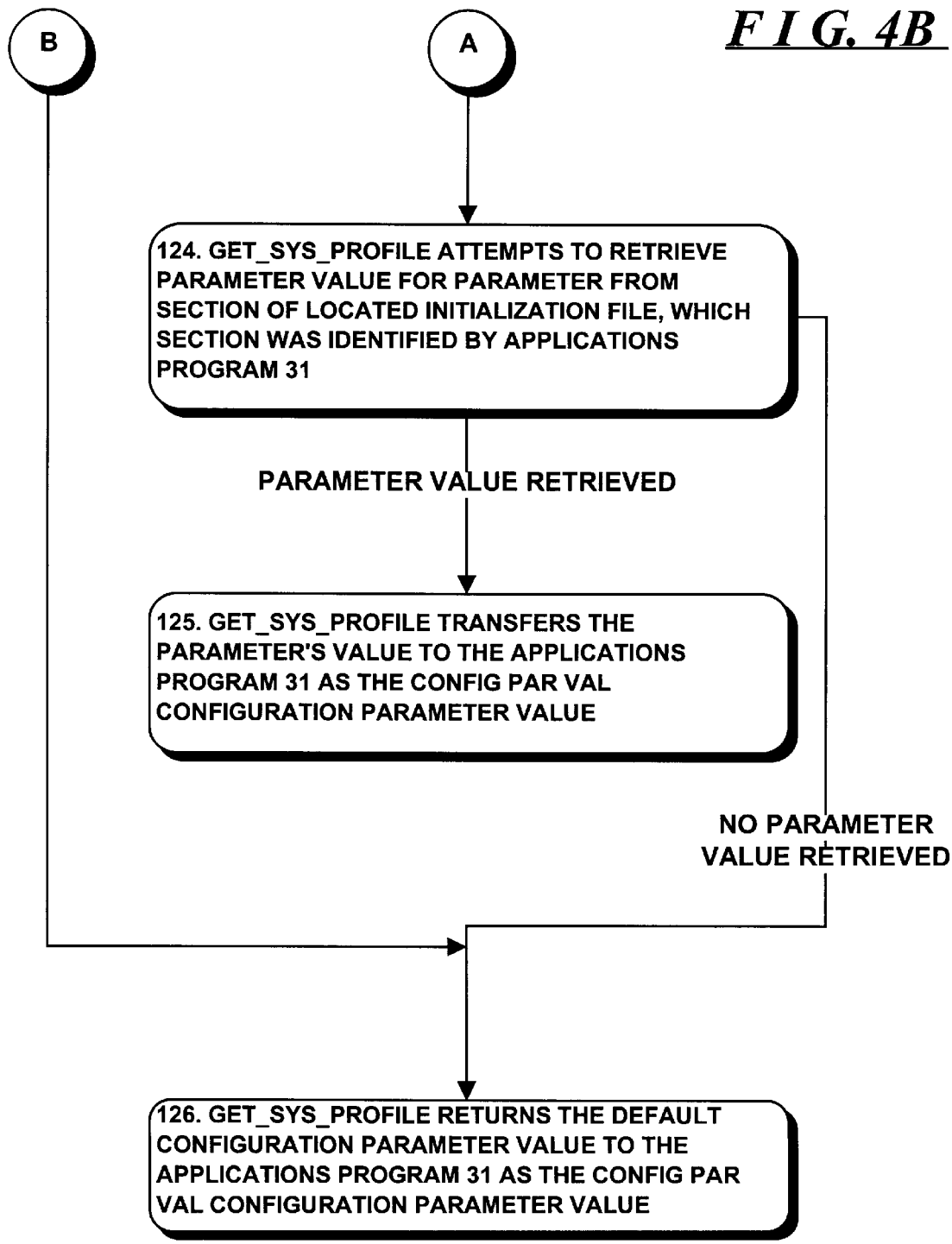
Figure 5A:
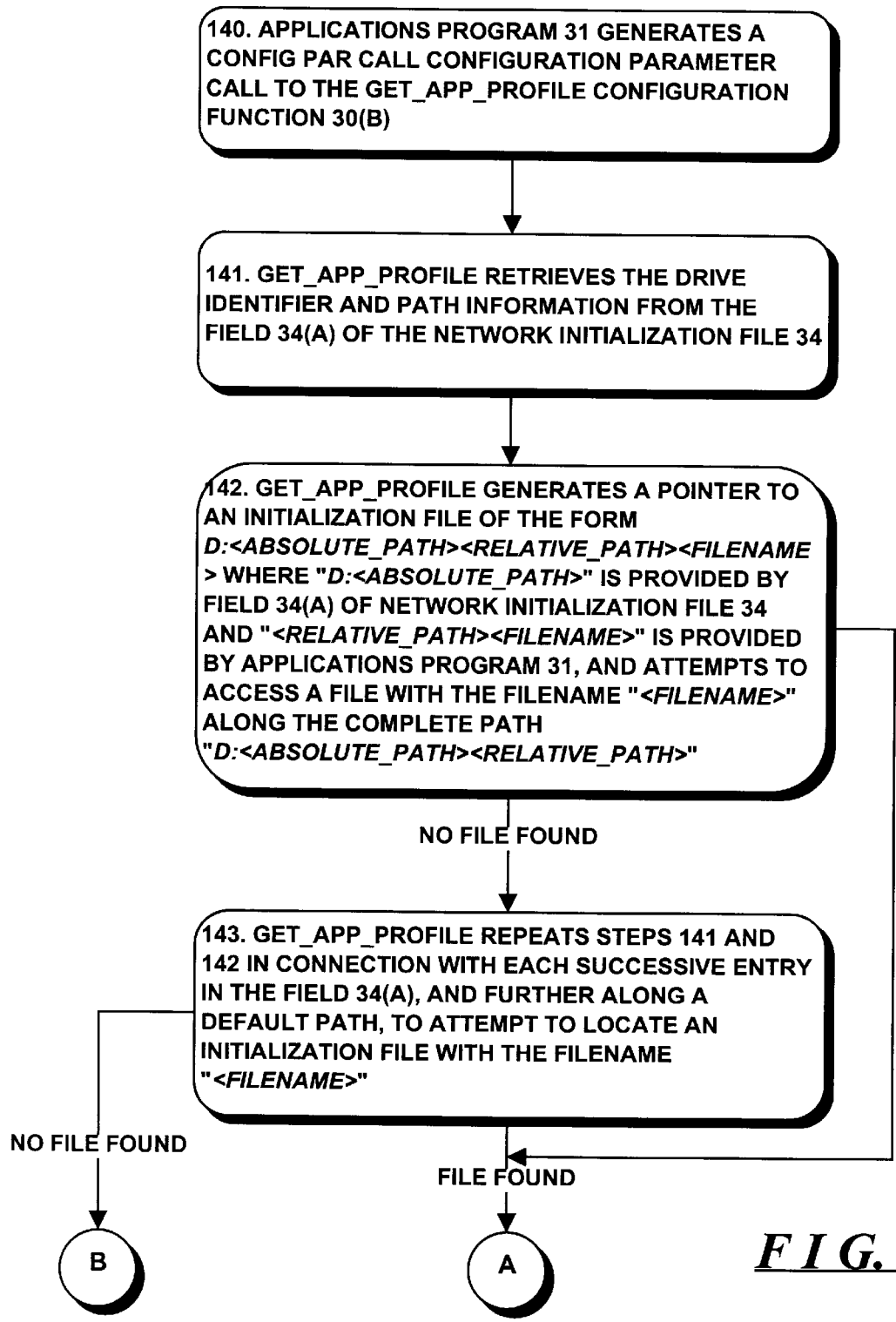
Figure 5B:
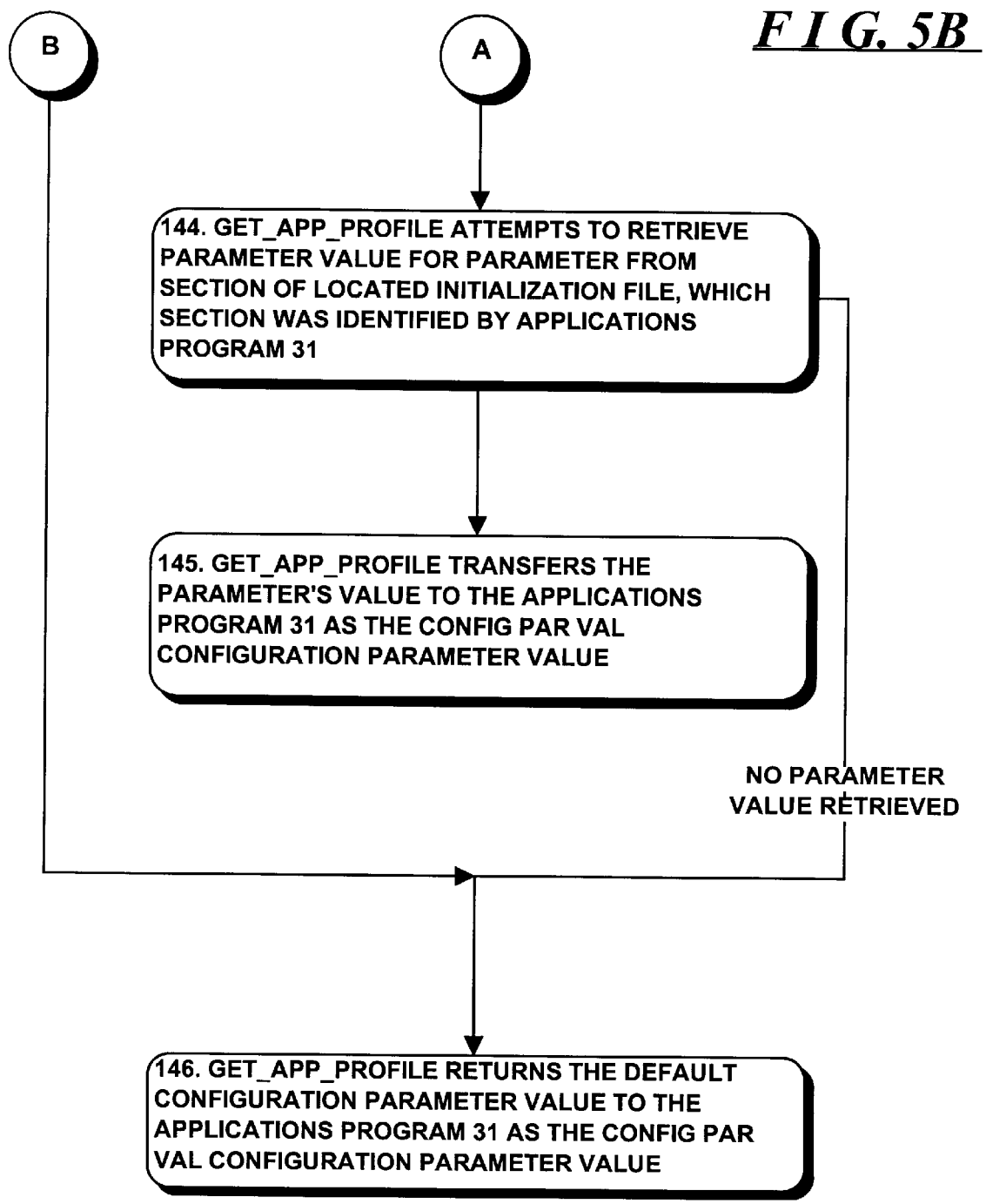

The operations performed by the GET_USER_PROFILE configuration function 30(A), the GET_APP_PROFILE function 30(B) and the GET_SYS_PROFILE function 30(C) in response to calls from the applications program 31 are depicted in flowcharts in FIGS. 3A and 3B, 4A and 4B, and 5A and 5B, respectively. With reference to FIGS. 3A and 3B, when the applications program 31 generates a CONFIG PAR CALL configuration parameter call to the GET_USER_PROFILE function 30(A) (step 100), the GET_USER_PROFILE function 30(A) retrieves the drive identifier and path information from the field 34(U) of the network ".INI" initialization file 34 (step 101). Following step 101, the GET_USER_PROFILE function will generate a pointer to a ".INI" initialization file by concatenating the path/filename information "<relative_path><filename>" from the configuration parameter call to the drive identifier and path information "d:<absolute_path>" from the field 34(U) of the network ".INI" initialization file 34, thereby to generate a file pointer of the form "d:<absolute_path><relative_path><filename>" as the pointer to the ".INI" file to be accessed. After generating the pointer, the GET_USER_PROFILE function will use it to attempt to access an ".INI" initialization file with the filename "<filename>" along the complete path "d:<absolute_path><relative_path>" (step 102).

As noted above, the field 34(U) of the network ".INI" initialization file 34, may contain "several entries." In that case, if the GET_USER_PROFILE function 30(A) is unable to locate a ".INI" initialization file with the name "<filename>" along the path "d:<absolute_path><relative_path>" using the first entry "d:<absolute_path>," it will repeat operations described above in connection with steps 101 and 102 in connection with each successive entry in the field 34(U) to attempt to locate such a ".INI" file with a generated pointer (step 103). If the GET_USER_PROFILE function 30(A) is unable to locate a ". INI" initialization file with the name "<filename>" along paths defined by any of the entries in field 34(U), it will in step 103 also attempt to locate such a file along a default path (such the "Windows" directory of the computer 12(n)).

If the GET_USER_PROFILE function 30(A) is able to locate a ".INI" initialization file using a file pointer "d:<absolute_path><relative_path><filename>" in either of steps 102 or 103, it attempts to retrieve the parameter value for the configuration parameter value identified in the call from the applications program 31 (step 104). In that operation, the GET_USER_PROFILE function 30(A) makes use of the Windows "GET_PRIVATE_PROFILE" function 35(A), which provides a parameter value from a file and section identified in the call to the GET_PRIVATE_PROFILE function. Accordingly, the GET_USER_PROFILE function 30(A) will call the "GET_PRIVATE_PROFILE" function with the file pointer for the located ".INI" initialization file, a parameter name and perhaps a section name. In one embodiment, the Windows ".INI" initialization files may be divided into a plurality of sections, with each section having a section name. Each section, in turn, can have values for one or more configuration parameters, with each configuration parameter having an identifier. In that embodiment, the various sections may have configuration parameters with the same name, and so the call to the GET_USER_PROFILE function 30(A) from the applications program 31, and the call to Windows's GET_PRIVATE_PROFILE function from the GET_USER_PROFILE function 30(A) will include, as noted above, both a section identifier SEC ID and a parameter identifier PAR ID.

When the GET_USER_PROFILE function 30(A) issues the call to the Windows GET_PRIVATE_PROFILE function 35(A), the GET_PRIVATE_PROFILE function attempts to locate a section and parameter which correspond to the section identifier SEC ID and a parameter identifier PAR ID in the file whose file pointer is provided by the GET_USER_PROFILE function 30(A). If the GET_PRIVATE_PROFILE function 30(A) is able to locate a section and parameter which correspond to the section identifier SEC ID and parameter identifier PAR ID provided by the GET_USER_PROFILE function 30(A), it will pass the parameter value to the GET_USER_PROFILE function 30(A) (step 104), which, in turn, transfers the parameter's value to the applications program 31 as the CONFIG PAR VAL configuration parameter value (step 105).

In one embodiment, the contents of the ".INI" initialization files are in ASCII text form, with each section identified by a section identifier in brackets "[xxx]" (where "xxx" is the section identifier in ASCII text form) on a separate line in the file, and each parameter and its value on a separate line. (In that embodiment, a "line" corresponds to an ASCII text string terminated by an ASCII code for "carriage return/line feed.") In that embodiment, the GET_PRIVATE_PROFILE function can locate the appropriate section by performing a conventional text string search to find the section identifier text string which corresponds to the ASCII text string for the section identifier SEC ID provided by the applications program 31. Similarly, it can to locate the appropriate parameter by performing a conventional text string search to find the parameter identifier text string which corresponds to the ASCII text string for the parameter identifier PAR ID provided by the applications program 31.

Returning to step 104, if the GET_USER_PROFILE function 30(A) is unable in that step to locate a file with the filename "<filename>" along the path "d:<absolute_path>" <relative_path> for any entry "d:<absolute_path>" in the fields 34(U) or along the default path, it will sequence to step 106 to return the default configuration parameter value to the applications program 31 as the CONFIG PAR VAL configuration parameter value. Similarly, if in step 104 the GET_PRIVATE_PROFILE function 35(A) is unable to find a parameter for the section identifier SEC ID and parameter identifier PAR ID in the file whose file pointer was provided by the GET_USER_PROFILE function 30(A), it (the GET_USER_PROFILE function 30(A)) will return the default configuration parameter value to the applications program 31 as the CONFIG PAR VAL configuration parameter value (step 106). As indicated above, the default configuration parameter value may be provided directly in the CONFIG PAR CALL configuration parameter call from the applications program 31, in which case the GET_USER_PROFILE function 30(A) will return that value. Alternatively, the CONFIG PAR CALL configuration parameter call may include a pointer to a default value, in which case the GET_USER_PROFILE configuration function 30(A) will use the pointer to retrieve the default value, which it will return to the applications program 31.

The operations performed by the GET_APP_PROFILE function 30(B) (FIGS. 4A and 4B) and the GET_SYS_PROFILE function 30(C) (FIGS. 5A and 5B) in response to respective CONFIG PAR CALL calls from the applications program 31 are similar to those in connection with the GET_USER_PROFILE configuration function 30(A) described above in connection with FIG. 3, and thus will not be separately described. The GET_SYS_PROFILE function 30(C), will perform a series of steps 120–126, which are similar to the sequence of steps 100 through 106 performed by the GET_USER_PROFILE function 30(A), except that in step 121 (which corresponds to step 101), the GET_SYS_PROFILE function 30(C) will retrieve and, in steps 122 and 123 (which correspond to steps 102 and 103), use the contents of field 34(S) in generating the ".INI" file pointer(s).

Similarly, the GET_APP_PROFILE function 30(B), will perform a series of steps 140–146, which are similar to the sequence of steps 100 through 106 performed by the GET_USER_PROFILE function 30(A) and steps 120 through 126 performed by the GET_SYS_PROFILE function 30(C), except that in step 141 (which corresponds to step 101), the GET_APP_PROFILE function 30(B) will retrieve and, in steps 142 and 143 (which correspond to steps 102 and 103), use the entry or entries of field 34(A) in generating the ".INI" file pointer(s).

Similarly, each of the WRT_USER_PROFILE function 30(D), and the WRT_SYS_PROFILE function 30(E), which are called by the applications program 31 to update values of configuration parameters in a ".INI" file, uses a number of call parameters provided by the applications program 31. In one embodiment, the call parameters include the section and configuration parameter identifier "SEC ID" and "CONFIG PAR ID", configuration parameter value information corresponding to the update configuration parameter value, and path/filename information of the form "<relative_path><filename>." The update configuration parameter value information may be in the form of the actual update value or a pointer to a storage location which contains the update value.

Figure 6A:
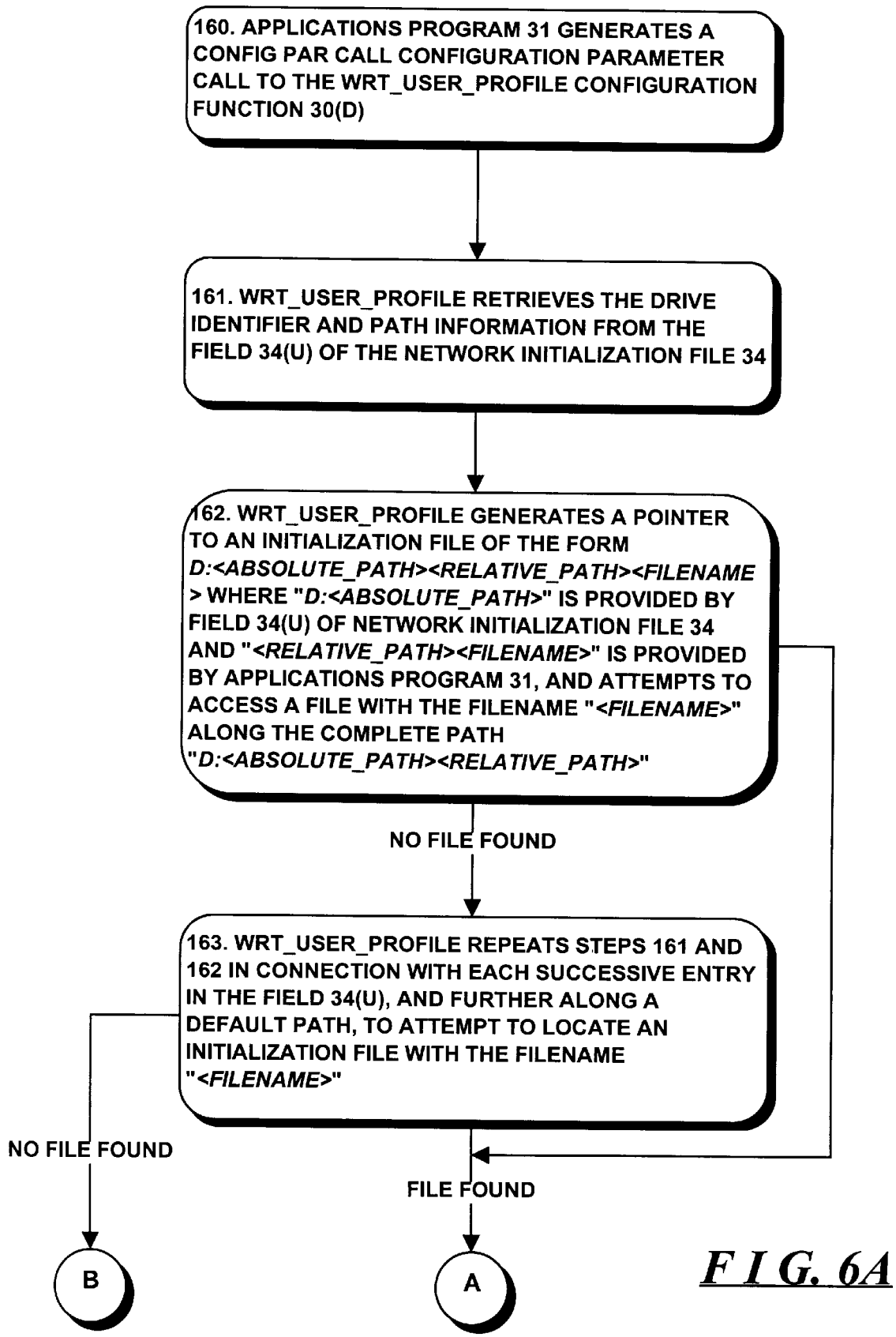
Figure 6B:
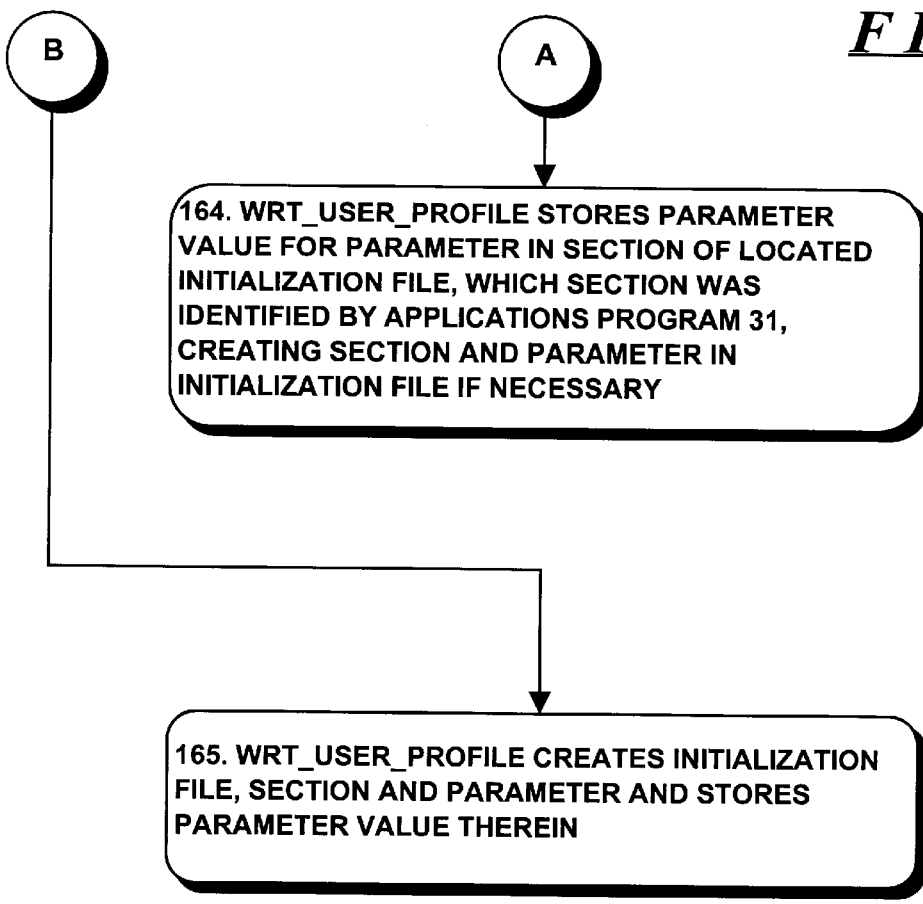
Figure 7A:
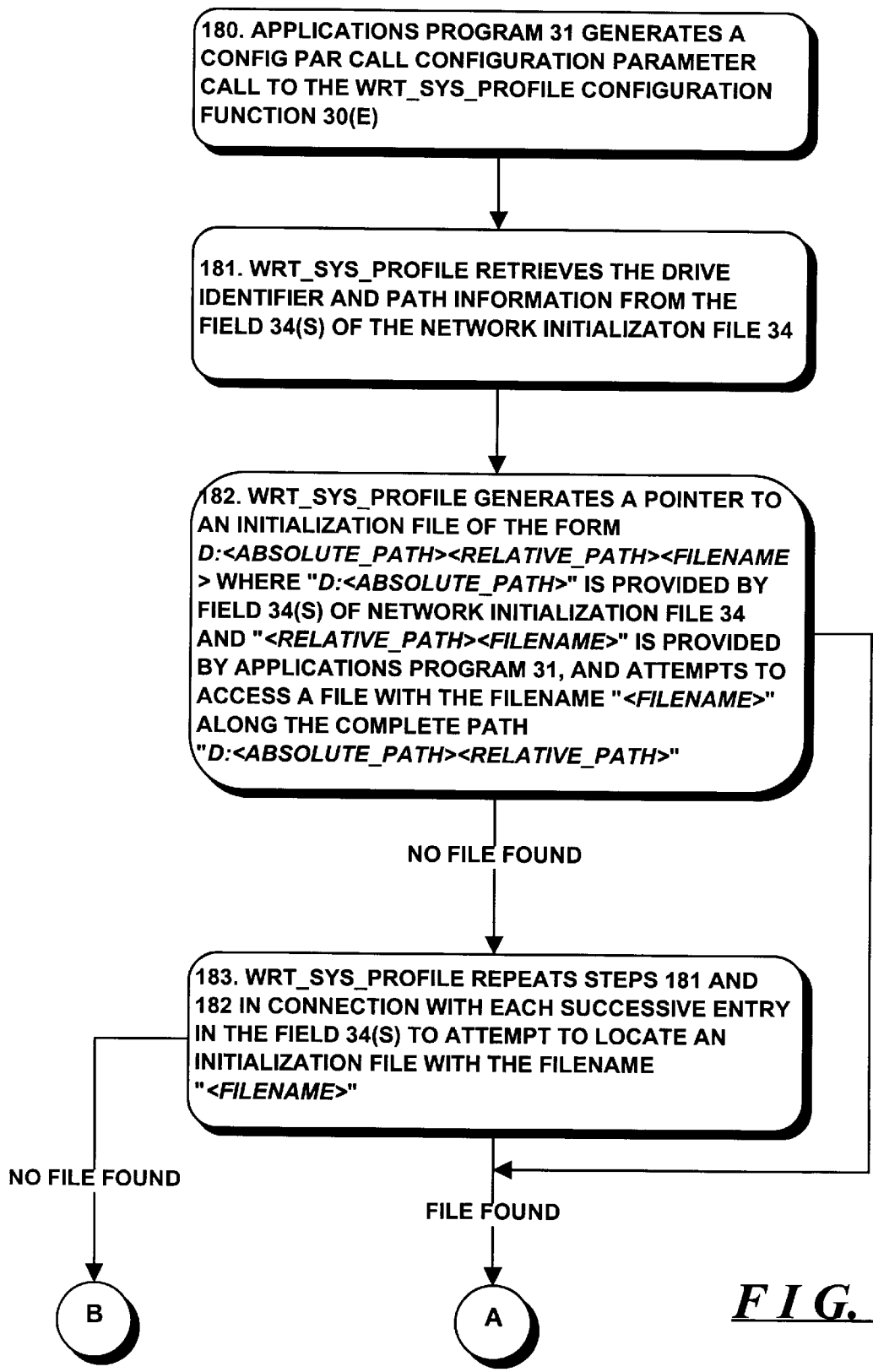

The operations performed by the WRT_USER_PROFILE function 30(D) and WRT_SYS_PROFILE function 30(E), are depicted in FIGS. 6A and 6B, and 7A and 7B, respectively. With reference to FIGS. 6A and 6B, when the applications program 31 generates a CONFIG PAR CALL configuration parameter call to the WRT_USER_PROFILE function 30(D) (step 160), the WRT_USER_PROFILE function 30(D) initially performs a series of steps 161 through 163 which are similar to steps 101 through 103 to use the drive identifier and path information from the field 34(U) of the network ".INI" initialization file 34 to generate a ".INI" initialization file pointer for the appropriate ".INI" initialization file containing a configuration parameter to be updated. If the WRT_USER_PROFILE function 30(D) is able to locate an appropriate ".INI" initialization file in steps 161 through 163, it uses the file pointer along with the section identifier SEC ID and parameter identifier PAR ID received from the applications program to store the parameter value in the ".INI" initialization file identified by the file pointer (step 164).

In one particular embodiment, the WRT_USER_PROFILE function 30(D) will use the Windows WRT_PRIVATE_PROFILE function 35(B) (FIG. 2) in performing step 164. In that embodiment, the WRT_USER_PROFILE function 30(D) will call the WRT_PRIVATE_PROFILE function 35(B), and in the call will provide the WRT_PRIVATE_PROFILE function 35(B) with the file pointer, section identifier SEC ID and parameter identifier PAR ID. The WRT_PRIVATE_PROFILE function 35(B), in turn, will locate the file identified by the file pointer, and the section and parameter, if any, which correspond to the section and parameter identified by section and parameter identifiers SEC ID and PAR ID provided in the call, to update the parameter value. If the WRT_PRIVATE_PROFILE function 35(B) is unable to locate, in the file identified by the file pointer, a section or parameter identified by the section and parameter identifiers SEC ID and PAR ID provided in the call, it will create such a section and/or parameter in the file and will provide the parameter with the parameter value as required in the call.

Returning to step 163, if the WRT_USER_PROFILE function 30(D) is unable to locate an ".INI" initialization file with the filename "<filename>" along the path "d:<absolute_path>" <relative_path> for any entry "d:<absolute_path>" in the fields 34(U) or along the default path, it will sequence to step 165. In that step, the WRT_USER_PROFILE function 30(D) will create the ".INI" initialization file in the default directory determined by the default path, establish a section and parameter in the newly-created file corresponding to the section and parameter identifiers SEC ID and PAR ID provided in the call, and will provide the parameter with the parameter value as required in the call. In one embodiment, the WRT_USER_PROFILE function 30(D) may also use the WRT_PRIVATE_PROFILE function 35(B) in performing step 165.

The WRT_SYS_PROFILE function 30(E), will perform a series of steps 180–185 (FIGS. 7A and 7B), which are similar to the sequence of steps 160 through 165 performed by the WRT_USER_PROFILE function 30(D), except that in step 181 (which corresponds to step 161), the WRT_SYS_PROFILE function 30(E) will retrieve and, in steps 182 and 183 (which correspond to steps 162 and 163), use the contents of field 34(S) in generating the ".INI" file pointer(s).

The invention provides a number of advantages. It will be appreciated that the invention provides a configuration parameter value retrieval and update system which, under control of file location information provided on a uniform basis by a network ".INI" initialization file, may access and retrieve, as well as update, configuration parameter value information for applications programs. The network ".INI" initialization file provides the file location information on a parameter class (user, application or system) basis, so that a system administrator can control the files from which parameter values are retrieved and updated on a parameter class basis.

It will be appreciated that numerous modifications may be made to the configuration parameter value retrieval and update system as described above. For example, while the system has been described in connection with use of initialization information contained in ".INI" files, it will be appreciated that the system may be used in connection with initialization information contained in files which do not have ".INI" file extensions. For example, although some versions of Windows may use ".INI" files to provide initialization information, other versions of Windows may use, for example, registration databases, which may not have a ".INI" file extension, to provide initialization information. Other operating system programs may use other types of files to provide initialization information.

Furthermore, although the configuration parameter value retrieval and update system has been described as having configuration parameter classes of "user," "application" and "system," it will be appreciated that the configuration parameter value retrieval and update system may have other parameter class organizations for their configuration parameters.

In addition, although the configuration parameter value retrieval and update system has been described as allowing each of the user initialization file location information field 34(U), applications program initialization file location information field 34(A) and the system initialization file location information field 34(S) to include path information for a plurality of paths, it will be appreciated that it may be desirable to limit one or more of the fields 34(U), 34(A) and 34(S) to path information for one or a selected maximum number of paths. For example, it may be desirable to limit the each of the fields 34(U) and 34(S) to path information for one path, which will ensure that only one path will be used for the initialization ".INI" files. This may be advantageous particularly in connection with updating of a parameter value, to ensure that there is no ambiguity as to the location of the particular initialization ".INI" file in which updating is to occur.

Furthermore, although the configuration parameter value retrieval and update system has been described as providing updates for configuration parameters of the user and system parameter classes, but not of the application parameter class, it will be appreciated that the system may include a WRT_APP_PROFILE write application profile function (not shown) to facilitate updating of the configuration parameters of the application class. If such a function is provided, as noted above, it may be desirable to limit the field 34(A) to one path, to ensure that there is no ambiguity as to the location of the particular initialization ".INI" file in which updating is to occur.

In addition, while the configuration parameter value retrieval and update system has been described in connection with a network 10 in which the user, application and system storage device/path information is stored in a network ".INI" initialization file 34 which is retrieved by each computer 12(n) when it initializes Windows, it will be appreciated that the system may also be used in connection with the user, application and system storage device/path information stored in another file which is accessible by the configuration functions 30(c).

Further, while the configuration parameter value retrieval and update system has been described in connection with ".INI" initialization files, each of which may have a plurality of sections, the system may be used in connection with ".INI" initialization files which have only a single section. In that case, the applications program 31 need not provide section identifier configuration parameter calls, and the configuration functions 30(c) need not perform respective steps 106, 126, 146, 166 and 186 to search for a section.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A configuration parameter value access system for use in connection with a computer system, the configuration parameter value access system performing an access operation in connection with a configuration parameter in response to a configuration parameter access request from an application program, the configuration parameter defining an operational characteristic for said application program, the configuration parameter access request including a filename and a parameter identifier, the configuration parameter value access system comprising:

A. a configuration file path list defining one or more paths in a storage subsystem;

B. a file identifier generator configured to determine whether the storage subsystem contains a file having a name corresponding to the filename provided in the configuration parameter access request along a path defined by the configuration file path list and, if so, to generate a file identifier identifying the file; and C. a configuration parameter access module configured to perform an access operation in connection with the configuration parameter identified by the parameter identifier provided in the configuration parameter access request in the file identified by the file identifier.

2. A configuration parameter value access system as defined in claim 1 in which said configuration file path list comprises a series of entries, each entry defining a path, the file identifier generator being configured to iteratively use one of the entries in the series to determine whether the storage subsystem contains a file having a name corresponding to the filename provided in the configuration parameter access request along a path defined by the entry until it determines that a file having the filename exists along the path.

3. A configuration parameter value access system as defined in claim 2 in which the file identifier generator is configured to use a default path after using all of the entries in the configuration file path list.

4. A configuration parameter value access system as defined in claim 1 in which one type of access operation performed by the configuration parameter access module is a retrieval operation, the configuration parameter access module being configured to, during a retrieval operation, retrieve a parameter value associated with a parameter identified by the parameter identifier from the file identified by the file identifier for transfer to the application program.

5. A configuration parameter value access system as defined in claim 4 in which the file comprises a plurality of sections each having a section name, each section having a plurality of parameters each having a parameter value, the configuration parameter access request further including a section identifier, the configuration parameter access module being configured to retrieve the parameter value for the parameter of the section whose section name corresponds to the section identifier.

6. A configuration parameter value access system as defined in claim 5 in which the configuration parameter access request further includes a default value, the configuration parameter access module being configured to provide the default value to the application program as the parameter value if the file identified by the file identifier does not have a section having a section name corresponding to the section identifier or a configuration parameter corresponding to the parameter identifier.

7. A configuration parameter value access system as defined in claim 4 in which the configuration parameter access request further includes a default value, the configuration parameter access module being configured to provide the default value to the application program as the parameter value if the file identified by the file identifier does not have a configuration parameter corresponding to the parameter identifier.

8. A configuration parameter value access system as defined in claim 4 in which said computer system uses the Microsoft Windows operating system program, the configuration parameter access module being configured to use a Windows "Get Private Profile" function in retrieving the parameter value.

9. A configuration parameter value access system as defined in claim 1 in which one type of access operation performed by the configuration parameter access module is an update operation, the configuration parameter access module being configured to, during an update operation, update a parameter value associated with a parameter identified by the parameter identifier from the file identified by the file identifier.

10. A configuration parameter value access system as defined in claim 9 in which the configuration parameter access module is configured to create a file along a default path in which it updates the parameter value if the file identifier generator determines that the storage subsystem does not contain a file having a name corresponding to the filename provided in the configuration parameter access request along a path defined by the configuration file path list.

11. A configuration parameter value access system as defined in claim 9 in which the file comprises a plurality of sections each having a section name, each section having a plurality of parameters each having a parameter value, the configuration parameter access request further including a section identifier, the configuration parameter access module being configured to update the parameter value for the parameter of the section whose section name corresponds to the section identifier.

12. A configuration parameter value access system as defined in claim 11 in which the configuration parameter access module is configured to create section and parameter if the file identified by the file identifier does not have a section having a section name corresponding to the section identifier or a configuration parameter corresponding to the parameter identifier.

13. A configuration parameter value access system as defined in claim 9 in which said computer system uses the Microsoft Windows operating system program, the configuration parameter access module being configured to use a Windows "Write Private Profile" function in updating the parameter value.

14. A configuration parameter value access system as defined in claim 1 in which the configuration file path list includes a plurality of configuration file path class lists, each class list defining one or more said paths, each configuration parameter access request identifying a path class, the file identifier generator being configured to determine whether the storage subsystem contains a file having a name corresponding to the filename provided in the configuration parameter access request along a path defined by one of said configuration file path class lists as identified by said configuration parameter access request and if so generating a file identifier identifying the file.

15. A configuration parameter value access system as defined in claim 1, the computer system connected in a network including a plurality of computer systems including at least one server computer system including a data store for storing the configuration file path list, at least one computer system being configured to retrieve the configuration file path list from said server computer system.

16. A method of operating a computer system to perform an access operation in connection with a configuration parameter in response to a configuration parameter access request from an application program, the configuration parameter defining an operational characteristic for said application program, the configuration parameter access request including a filename and a parameter identifier, the method comprising the steps of:
　A. providing a configuration file path list defining one or more paths in a storage subsystem;
　B. determining whether the storage subsystem contains a file having a name corresponding to the filename provided in the configuration parameter access request along a path defined by the configuration file path list and if so generating a file identifier identifying the file; and
　C. performing an access operation in connection with the configuration parameter identified by the parameter identifier provided in the configuration parameter access request in the file identified by the file identifier.

17. A method as defined in claim 16 in which at least one said configuration file path class list comprises a series of entries, each entry defining a path, the entries in the series being iteratively used to determine whether the storage subsystem contains a file having a name corresponding to the filename provided in the configuration parameter access request along a path defined by the entry until a determination is made that a file having the filename exists along the path.

18. A method as defined in claim 17, in which a default path is further used in determining whether the storage subsystem contains a file having a name corresponding to the filename provided in the configuration parameter access request, after all of the entries in the configuration file path list have been used.

19. A method as defined in claim 16, in which one types of access operation is a retrieval operation, during which a parameter value associated with a parameter identified by the parameter identifier is retrieved from the file identified by the file identifier for transfer to the application program.

20. A method as defined in claim 19 in which the file comprises a plurality of sections each having a section name, each section having a plurality of parameters each having a parameter value, the configuration parameter access request further including a section identifier, the parameter value being retrieved for the parameter of the section whose section name corresponds to the section identifier.

21. A method as defined in claim 20 in which the configuration parameter access request further includes a default value, the default value being provided to the application program as the parameter value if the file identified by the file identifier does not have a section having a section name corresponding to the section identifier or a configuration parameter corresponding to the parameter identifier.

22. A method as defined in claim 19 in which the configuration parameter access request further includes a default value, the default value being provided to the application program as the parameter value if the file identified by the file identifier does not have a configuration parameter corresponding to the parameter identifier.

23. A method as defined in claim 19 in which said computer system uses the Microsoft Windows operating system program, the Windows "Get Private Profile" function being used in retrieving the parameter value.

24. A method as defined in claim 16 in which the one type of access operation is an update operation during which a parameter value associated with a parameter identified by the parameter identifier is updated in the file identified by the file identifier.

25. A method as defined in claim 24 in which a file is created along a default path including the updated parameter value if the storage subsystem does not contain a file having a name corresponding to the filename provided in the configuration parameter access request along a path defined by the configuration file path list.

26. A method as defined in claim 24 in which the file comprises a plurality of sections each having a section name, each section having a plurality of parameters each having a parameter value, the configuration parameter access request further including a section identifier, the parameter value being updated for the parameter of the section whose section name corresponds to the section identifier.

27. A method as defined in claim 26 in which section and parameter are created in the file if the file identified by the file identifier does not have a section having a section name corresponding to the section identifier or a configuration parameter corresponding to the parameter identifier.

28. A method as defined in claim 24 in which said computer system uses the Microsoft Windows operating system program, a Windows "Write Private Profile" function being used in updating the parameter value.

29. A method as defined in claim 16 in which the paths identified by the configuration file path class lists can be updated by a system administrator.

30. A method as defined in claim 16, the computer system connected in a network including a plurality of computer systems including at least one server computer system including a data store for storing the configuration file path list, the configuration file path list being retrieved by at least one computer system from said server computer system.

31. A computer program product comprising a computer system usable medium having computer system readable code embodied therein to enable the computer system to perform an access operation in connection with a configuration parameter in response to a configuration parameter access request from an application program, the configuration parameter defining an operational characteristic for said application program, the configuration parameter access request including a filename and a parameter identifier, the computer program product comprising:

A. configuration file path list program code devices configured to cause the computer system to generate a configuration file path list defining one or more paths in a storage subsystem;

B. file identifier generator program code devices configured to cause the computer system to determine whether the storage subsystem contains a file having a name corresponding to the filename provided in the configuration parameter access request along a path defined by the configuration file path list and, if so, to generate a file identifier identifying the file; and C. configuration parameter access program code devices configured to cause the computer system to perform an access operation in connection with the configuration parameter identified by the parameter identifier provided in the configuration parameter access request in the file identified by the file identifier.

32. A computer program product as defined in claim 31 in which said configuration file path list program code devices are configured to cause the computer system to generate the configuration file path list as a series of entries, each entry defining a path, the file identifier generator program code devices being configured to enable the computer to iteratively use one of the entries in the series to determine whether the storage subsystem contains a file having a name corresponding to the filename provided in the configuration parameter access request along a path defined by the entry until it determines that a file having the filename exists along the path.

33. A computer program product as defined in claim 32 in which the file identifier generator program code devices are further configured to cause the computer system to use a default path after using all of the entries in the configuration file path list.

34. A computer program product as defined in claim 31 in which one type of access operation performed by the computer system under control of the configuration parameter access program code devices is a retrieval operation, the configuration parameter access program code devices being configured to enable the computer system, during a retrieval operation, to retrieve a parameter value associated with a parameter identified by the parameter identifier from the file identified by the file identifier for transfer to the application program.

35. A computer program product as defined in claim 34 in which the file comprises a plurality of sections each having a section name, each section having a plurality of parameters each having a parameter value, the configuration parameter access request further including a section identifier, the configuration parameter access program code devices being configured to enable the computer system to retrieve the parameter value for the parameter of the section whose section name corresponds to the section identifier.

36. A computer program product as defined in claim 35 in which the configuration parameter access request further includes a default value, the configuration parameter access program code devices being configured to enable the computer system to provide the default value to the application program as the parameter value if the file identified by the file identifier does not have a section having a section name corresponding to the section identifier or a configuration parameter corresponding to the parameter identifier.

37. A computer program product as defined in claim 34 in which the configuration parameter access request further includes a default value, the configuration parameter access program code devices further being configured to enable the computer system to provide the default value to the application program as the parameter value if the file identified by the file identifier does not have a configuration parameter corresponding to the parameter identifier.

38. A computer program product as defined in claim 34 in which said computer system uses the Microsoft Windows operating system program, the configuration parameter access program code devices being configured to use a Windows "Get Private Profile" function in enabling the computer system to retrieve the parameter value.

39. A computer program product as defined in claim 31 in which one type of access operation performed by the configuration parameter access module is an update operation, the configuration parameter access program code devices being configured to enable the computer system to, during an update operation, update a parameter value associated with a parameter identified by the parameter identifier from the file identified by the file identifier.

40. A computer program product as defined in claim 39 in which the configuration parameter access program code devices are configured to enable the computer system to create a file along a default path in which it updates the parameter value if the file identifier generator program code devices enable the computer system to determine that the storage subsystem does not contain a file having a name corresponding to the filename provided in the configuration parameter access request along a path defined by the configuration file path list.

41. A computer program product as defined in claim 39 in which the file comprises a plurality of sections each having a section name, each section having a plurality of parameters each having a parameter value, the configuration parameter access request further including a section identifier, the configuration parameter access program code devices being configured to enable the computer system to update the parameter value for the parameter of the section whose section name corresponds to the section identifier.

42. A computer program product as defined in claim 40 in which the configuration parameter access program code devices are configured to enable said computer system to create a section and parameter if the file identified by the file identifier does not have a section having a section name corresponding to the section identifier or a configuration parameter corresponding to the parameter identifier.

43. A computer program product as defined in claim 39 in which said computer system uses the Microsoft Windows operating system program, the configuration parameter access program code devices being configured to enable said computer system to use a Windows "Write Private Profile" function in updating the parameter value.

44. A computer program product as defined in claim 31 in which the configuration file path list includes a plurality of configuration file path class lists, each class list defining one or more said paths, each configuration parameter access request identifying a path class, the file identifier generator program code devices being configured to enable said computer system to determine whether the storage subsystem contains a file having a name corresponding to the filename provided in the configuration parameter access request along a path defined by one of said configuration file path class lists as identified by said configuration parameter access request and if so generate a file identifier identifying the file.

45. A computer program product as defined in claim 31, the computer system connected in a network including at least one server computer system including a data store for storing the configuration file path list, the computer program product being configured to enable the computer system to retrieve the configuration file path list from said server computer system.

* * * * *